May 13, 1924.

J. C. TURNER

AUTO MOTOR

Filed Oct. 9, 1922

JAMES C. TURNER    INVENTOR.

BY

ATTORNEY

May 13, 1924.
J. C. TURNER
AUTO MOTOR
Filed Oct. 9, 1922
1,493,654
2 Sheets-Sheet 2
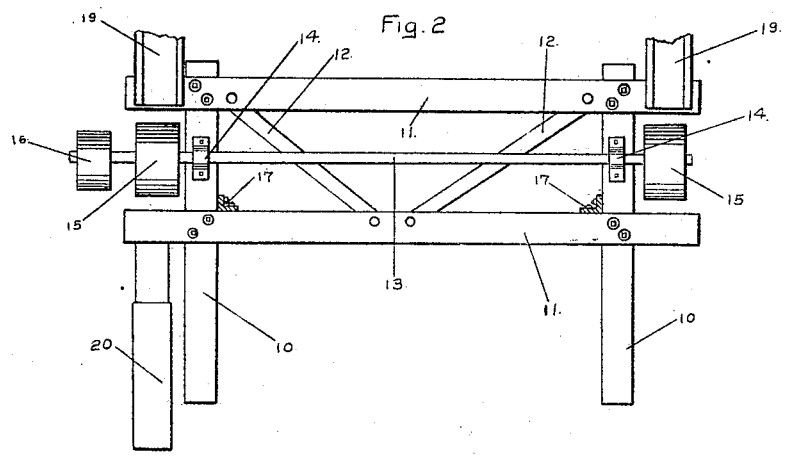
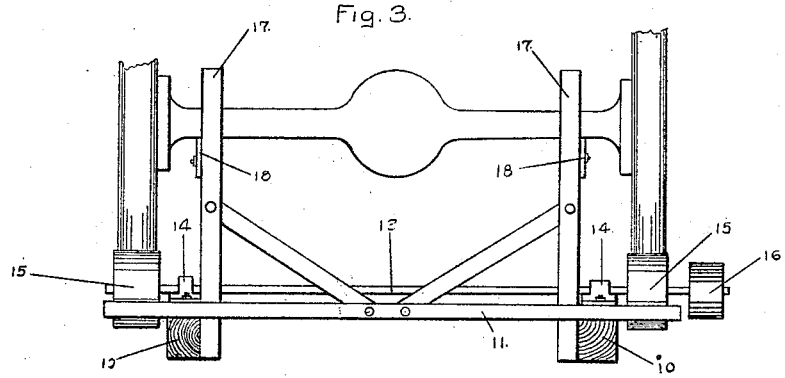
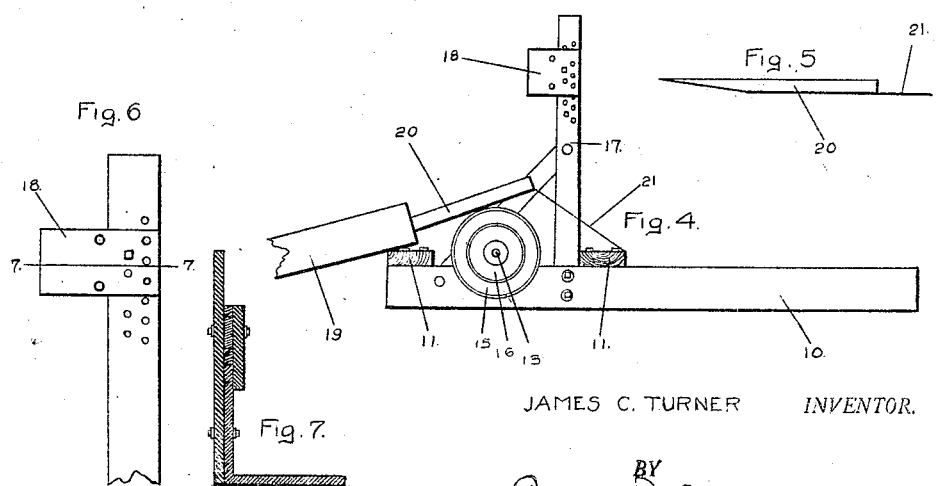
JAMES C. TURNER INVENTOR.
BY Emil F. Lange ATTORNEY Patented May 13, 1924.

1,493,654

UNITED STATES PATENT OFFICE.

JAMES C. TURNER, OF LINCOLN, NEBRASKA.

AUTO MOTOR.

Application filed October 9, 1922. Serial No. 593,365.

*To all whom it may concern:*

Be it known that I, JAMES C. TURNER, a citizen of the United States, residing at Lincoln, in the county of Lancaster and State of Nebraska, have invented certain new and useful Improvements in Auto Motors, of which the following is a specification.

My invention relates to auto-powers or devices whereby the power of an automobile engine can be expeditiously employed for operating power machinery, such as feed grinders, concrete mixers and the like.

One of my objects is the provision of an auto-power which is sturdy and rigid in construction, and which is free from all complicated adjustments.

Another of my objects is to provide such a device which can be manufactured and sold at a price which is attractive to all who have need for an auto-power.

My main object however is to provide an auto-power which can be placed into and out of operative relation with the automobile in the minimum amount of time, and which will have no deleterious effect on the automobile or on the tires or bearings.

Having in view these and other objects which will appear in the description, I will now refer to the drawings, in which Figure 1 is a side elevation of my auto-power in operative relation with the automobile.

Figure 2 is a top plan view of the auto-power alone.

Figure 3 is a rear elevation of my device, the rear axle and wheels of the automobile also being shown.

Figure 4 is a side elevation of my device as it appears when ready to receive the automobile.

Figure 5 is a detail view of the wedge block which serves to lift the automobile into operative position.

Figure 6 is a detail view of the standard and the adjusting means, and

Figure 7 is a sectional view on line 7—7 of Figure 6.

Figure 1:
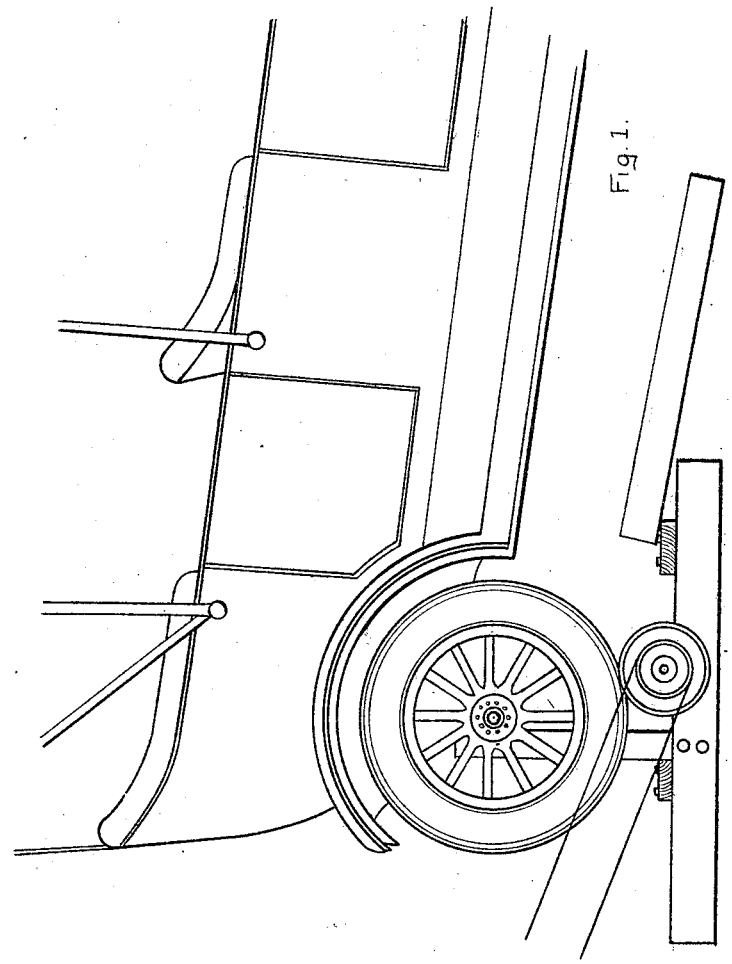

The base of my auto power is formed out of two heavy beams 10 positioned longitudinally, and two beams 11 placed cross wise and secured to the beams 10. The base is suitably braced in any approved manner, as by means of braces 12.

The shaft 13 is parallel to the beams 11 and is rotatably secured to and cross wise of the beams 10 by means of any suitable journal boxes 14, which elevate the shaft slightly above the level of the beams 11, as shown in Figure 3. Pulleys 15 are secured to the shaft 13 outside the beams 10. Since these pulleys 15 are designed for contact with the tires of the rear wheels of an automobile, they are appropriately spaced with this end in view. At one of the outer ends of the shaft 13 I secure the driving pulley 16.

Mounted on the base and in perpendicular relation thereto are two uprights 17, and braces 18 hold the uprights in rigid relation with the base. The uprights 17 are preferably constructed out of angle iron with the walls of the angle iron positioned as shown in Figure 2. To the wall which is positioned longitudinally with relation to the device I secure a projecting lug 18.

I have found from repeated experiments that if the entire weight of the rear end of the automobile rests on the pulleys 15, there is considerable loss of power through slippage, and this slippage also causes serious wear on the tires. The above described construction is designed to entirely prevent such slippage, or at least to keep it down to the minimum. When the rear axle of the automobile rests on the lugs 18, a frictional contact is made between the automobile tires and the pulleys 15, but the whole weight of the rear end of the automobile does not rest on these pulleys, with the result that the slippage is negligible.

Automobile wheels vary considerably in size, which makes it necessary to provide for the adjustability in height of the lugs 18. The specific adjustment which I employ is shown in Figure 4 and more clearly in Figure 6. The wall of the angle iron upright has two parallel columns of apertures which are staggered in position, but which are equidistantly spaced in the columns. The face of the lug 18 also has two parallel columns of apertures. The distance between these columns is exactly the same as the distance between the columns of apertures in the standard, and the apertures of the lugs are also equidistantly spaced in their columns. There is one difference however. The spacing of the apertures in the lugs is not the same as the spacing of the apertures in the uprights. In my auto-power as constructed, it is possible by sliding the lug 18 up and down on its standard, to get only one pair of registering apertures at a time, but with minute variations in height from one pair of registering apertures to the next pair. This construction gives a fine adjustment to provide for minute variations in the pressure of the automobile tires on the pulleys 15.

It is necessary in a device of this kind to provide means for putting the automobile into and out of operative contact with the device, and it is important that this be done quickly and easily. For this purpose I employ a channeled track 19 on each side of the base. The tracks 19 are inclined, the lower end resting on the ground and the upper ends terminating near the pulleys 15. The tracks are of course spaced the same as the wheels on the axle of the automobile. Before backing the automobile up on the inclined tracks 19, I place the wedge blocks 20 in the position shown in Figure 4, with their lower ends resting in the channeled tracks and their upper ends resting on the respective pulleys 15. The automobile is then backed with its rear wheels in the channels of the tracks 19. The rear wheels will ride up on the wedge blocks 20 and out of direct contact with the pulleys 15, and at the same time the rear axle of the automobile will be caused to assume a position slightly above the lugs 18. When this position is reached, the forward gear is thrown in, which causes the wheels to kick out the wedge blocks 20 and to thus lower the automobile to the position where the rear axle will rest on the lugs 18 and the tires will be in just sufficient frictional contact with the pulleys 15 to be most effective.

The specific structure shown includes a number of details which are susceptible of modification. The lug 18 as shown, in Figure 7, is made by bolting or otherwise securing together three metal plates, the inner one being shorter than either of the outer ones but with approximately the same thickness as that of the wall of the angle iron standard. This construction facilitates the sliding of the lug on the standard and helps to hold the lug in position, so that only one bolt connection is needed to securely hold the lug. It is understood of course that when adjustment is once made for an automobile, it is not necessary to disturb that adjustment as long as any car having wheels of the same size is used. I have also shown the wedge block 20 connected to the base by means of a strap 21. This strap may be made of fabric, leather or any other suitable flexible material, and serves to hold the wedge blocks in assembled relation with the auto-power and to prevent the losing or misplacing of the wedge blocks.

Having thus described my invention and its advantages, as well as its mode of operation, what I believe to be new and desire to secure by Letters Patent of the United States is:—

1. In an auto power, a support for the rear axle of an automobile, a rotatable shaft secured on the level and in spaced relation with said support, a pair of pulleys secured to said shaft, said pulleys being adapted to be frictionally engaged by the rear wheels of the automobile and being adapted also to partially support the weight of the automobile, single means for simultaneously adjusting the height of said support and the pressure of the automobile wheels on said pulleys, and means whereby the power of the automobile may be utilized to position the automobile on the auto power or to remove it therefrom without disturbing the adjustment of said adjusting means.

2. In an auto-power, a base, a shaft rotatably secured to and transversely of said base, a pair of driven pulleys secured to said shaft, and means for bringing the rear wheels of an automobile into frictional contact with said driven pulleys, said means including an inclined track associated with each of said pulleys, the upper end of each track being contiguous to its respective pulley, and a wedge block which is adapted to rest with its ends on the track and the pulley respectively, whereby the automobile can be backed in reverse gear on to the wedge block and whereby the wedge block may be thrown out by shifting the gear into forward to thereby lower the rear wheels of the automobile into frictional contact with the driven pulleys.

3. An auto-power comprising a base, a shaft journalled transversely in said base, said shaft having secured thereto a driving pulley and a pair of driven pulleys, said driven pulleys being adapted to frictionally engage the rear wheels of an automobile and to partially support the rear end of the automobile, standards secured at their lower ends to said base, lugs secured to said standards, said lugs being vertically adjustable on said standards and projecting above and to one side of said shaft, an inclined track associated with each of said driven pulleys and positioned on the side of said shaft opposite said lugs, said tracks being channeled, and a pair of wedge blocks flexibly connected to said base, each of said wedge blocks being adapted to be placed with its ends on the track and driven pulley respectively, whereby when the automobile is backed on the tracks the rear wheels of the automobile will be on the wedge blocks above the respective driven pulleys and the rear axle of the automobile will be above the projecting lugs so that when the driving gear of the automobile is reversed the wedge blocks will be thrown out to lower the automobile with its wheels resting on the respective driven pulleys and with its rear axle resting on the projecting lugs.

In testimony whereof I affix my signature.

JAMES C. TURNER.